United States Patent
Fakler et al.

(10) Patent No.: US 8,290,655 B2
(45) Date of Patent: *Oct. 16, 2012

(54) HYBRID DRIVE MOTOR VEHICLE CONTROL SYSTEM COMPRISING DISTRIBUTED FUNCTIONAL COMPONENTS FOR CONTROLLING HYBRID DRIVE OPERATING STATUS

(75) Inventors: Winfried Fakler, Eriskirch (DE);
Notker Amann, Friedrichshafen (DE);
Christian Mittelberger, Ravensburg (DE); Mesut Er, Friedrichshafen (DE);
Stefan Blattner, Vogt (DE); Johannes Kaltenbach, Friedrichshafen (DE);
Stefan Wallner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 326 days.

This patent is subject to a terminal disclaimer.

(21) Appl. No.: 12/739,233

(22) PCT Filed: Oct. 16, 2008

(86) PCT No.: PCT/EP2008/063936
§ 371 (c)(1),
(2), (4) Date: Apr. 22, 2010

(87) PCT Pub. No.: WO2009/053294
PCT Pub. Date: Apr. 30, 2009

(65) Prior Publication Data
US 2011/0166726 A1    Jul. 7, 2011

(30) Foreign Application Priority Data
Oct. 24, 2007 (DE) .................. 10 2007 050 773

(51) Int. Cl.
*B60K 6/00* (2007.10)
*B60W 10/06* (2006.01)

(52) U.S. Cl. .... 701/22; 701/99; 180/65.265; 180/65.28; 903/902

(58) Field of Classification Search .......... 700/4; 701/1, 701/22, 99, 101, 102, 112, 113, 48; 180/54.1, 180/65.1, 65.265, 65.275, 65.28, 65.285, 180/65.29; 477/2, 3, 5, 6; 903/902, 903, 903/930, 946
See application file for complete search history.

(56) References Cited

U.S. PATENT DOCUMENTS
5,815,824 A    9/1998 Saga et al.
(Continued)

FOREIGN PATENT DOCUMENTS
EP    0 925 979 A2    6/1999
(Continued)

OTHER PUBLICATIONS
Schilke et al., Integrated Vehicle Control, 1988, International Congress on Transportation Electronics (Convergence '88), pp. 97-106.*
(Continued)

*Primary Examiner* — Russell Frejd

(57) ABSTRACT

A control system for controlling a vehicle with a hybrid drive comprising an internal combustion engine and an electric motor and a plurality of functional components each divided into strategy, control and actuator sub-components. The functional components include engine, transmission and hybrid functional components. The strategy sub-component of the hybrid functional component comprises an operating status prescription module which determines a recommended value for the operating status of the hybrid drive and transmits the recommended value to the control sub-component. The possible recommended value that can be determined by the operating status prescription module is a preselected hybrid driving condition, and if the operating status prescription module of the strategy sub-component transmits the preselected hybrid driving condition, as the recommended value, to the control sub-component, then the strategy sub-component prescribes a change from electric to hybrid driving, while the control sub-component determines when change occurs.

5 Claims, 1 Drawing Sheet

U.S. PATENT DOCUMENTS

| | | | |
|---|---|---|---|
| 5,979,257 A | 11/1999 | Lawrie | |
| 6,223,106 B1 * | 4/2001 | Yano et al. | 701/22 |
| 6,321,143 B1 * | 11/2001 | Phillips et al. | 701/22 |
| 6,360,152 B1 * | 3/2002 | Ishibashi et al. | 701/48 |
| 6,638,195 B2 * | 10/2003 | Williams | 477/5 |
| 6,735,502 B2 * | 5/2004 | Phillips et al. | 701/22 |
| 6,810,314 B2 * | 10/2004 | Tashiro et al. | 701/48 |
| 6,898,500 B2 * | 5/2005 | Kobayashi | 701/48 |
| 6,973,383 B2 * | 12/2005 | Mitsutani et al. | 701/112 |
| 7,017,692 B2 | 3/2006 | Grassl et al. | |
| 7,047,117 B2 * | 5/2006 | Akiyama et al. | 701/48 |
| 7,072,751 B2 * | 7/2006 | Shimizu | 701/36 |
| 7,198,123 B2 * | 4/2007 | Imazu et al. | 180/65.25 |
| 7,219,756 B2 * | 5/2007 | Bischoff | 180/65.285 |
| 7,219,757 B2 * | 5/2007 | Tomita et al. | 180/65.275 |
| 7,274,981 B2 * | 9/2007 | Eriksson | 701/37 |
| 7,407,026 B2 * | 8/2008 | Tamor | 180/65.28 |
| 7,537,542 B2 * | 5/2009 | Cawthorne et al. | 477/3 |
| 7,568,994 B2 * | 8/2009 | Heap | 477/3 |
| 7,691,026 B2 * | 4/2010 | Heap et al. | 477/3 |
| 7,739,013 B2 * | 6/2010 | Ishio et al. | 701/48 |
| 7,766,107 B2 * | 8/2010 | Joe et al. | 180/65.21 |
| 7,826,941 B2 * | 11/2010 | Hayashi et al. | 701/22 |
| 7,878,281 B2 * | 2/2011 | Tanishima | 180/65.265 |
| 7,983,823 B2 * | 7/2011 | Heap | 701/51 |
| 8,167,066 B2 * | 5/2012 | Joos et al. | 180/65.265 |
| 2003/0098187 A1 | 5/2003 | Phillips et al. | |
| 2005/0023055 A1 * | 2/2005 | Imazu et al. | 180/65.2 |
| 2005/0049722 A1 * | 3/2005 | Kobayashi | 700/9 |
| 2006/0048516 A1 | 3/2006 | Tenbrock et al. | |
| 2006/0048988 A1 | 3/2006 | Dreibholz et al. | |
| 2007/0056783 A1 | 3/2007 | Joe et al. | |

FOREIGN PATENT DOCUMENTS

| | | |
|---|---|---|
| EP | 1 762 417 A1 | 3/2007 |
| WO | 02/26520 A1 | 4/2002 |
| WO | 2007/107361 A1 | 9/2007 |
| WO | 2009/053292 A1 | 4/2009 |

OTHER PUBLICATIONS

Clements et al, Component Based Modeling and Fault Tolerant Control of Complex Systems, The 19$^{th}$ Digital Avionics Systems Conference, 2000, pp. 6F4/1-6F4/4.*

Guler et al, Rapid Prototyping of Transition Management Code for Reconfigurable Control Systems, 13$^{th}$ IEEE International Workshop on Rapid System Prototyping, 2002, pp. 76-83.*

Beydoun et al, Coordination of Engine and Transmission Using Hybrid Control Methodologies, Proceedings of the 1998 American Control Conference, 1998, pp. 1395-1399.*

* cited by examiner

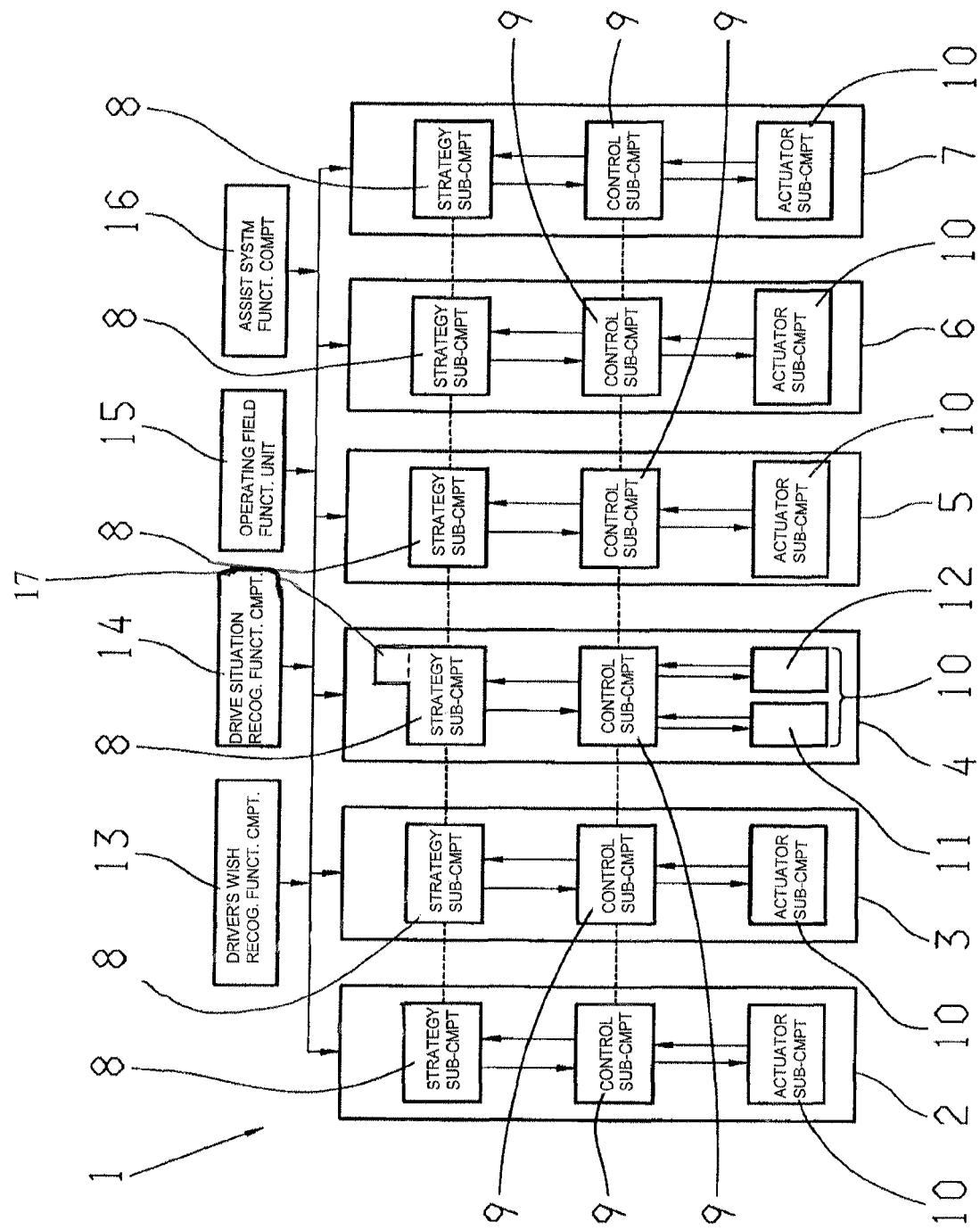

HYBRID DRIVE MOTOR VEHICLE CONTROL SYSTEM COMPRISING DISTRIBUTED FUNCTIONAL COMPONENTS FOR CONTROLLING HYBRID DRIVE OPERATING STATUS

This application is a National Stage completion of PCT/EP2008/063936 filed Oct. 16, 2008, which claims priority from German patent application serial no. 10 2007 050 773.0 filed Oct. 24, 2007.

FIELD OF THE INVENTION

The invention concerns a motor vehicle control system for controlling a motor vehicle with a hybrid drive comprising an internal combustion engine and an electric motor.

BACKGROUND OF THE INVENTION

A motor vehicle control system has a number of functional components, for example, an internal combustion engine functional component, a transmission functional component, a brake functional component and a battery functional component, such that the individual functional components acting in co-ordination ensure the correct operation of the motor vehicle. A motor vehicle control system, for controlling a motor vehicle with a hybrid drive, additionally requires a hybrid functional component.

In motor vehicle control systems known from the prior art for controlling a motor vehicle with hybrid drive, a recommended value for an operating status of the hybrid drive is generated with the help of so-termed automatic status-determining means. Owing to the number and variety of input parameters to be taken into account when determining a recommended value for the operating status of the hybrid drive, there are complex status-determining means which, on the one hand, can only be realized with much effort and expense and, on the other hand, can only be adapted or changed, again with considerable effort and expense. This is also the case because the definition of suitable recommended values for the operating status of the hybrid drive presents difficulties.

SUMMARY OF THE INVENTION

Starting from there, the present invention addresses the problem of providing a new type of motor vehicle control system for controlling a motor vehicle with a hybrid drive comprising an internal combustion engine and an electric motor.

The motor vehicle control system according to the invention comprises a plurality of functional components divided into at least three sub-components, namely, a strategy sub-component, a control sub-component and an actuator sub-component, to be specific at least an internal combustion engine functional component for controlling the internal combustion engine, a transmission functional component for controlling a transmission and a hybrid functional component for controlling the electric motor and a clutch connected between the internal combustion engine and the electric motor, such that the strategy sub-component of the hybrid functional component comprises an operating status prescription module which determines a recommended value for the operating status of the hybrid drive and transmits the said recommended value to the control sub-component, and such that a possible recommended value that the said operating status prescription module can determine is a preselected hybrid driving condition, and when the operating status prescription module of the strategy sub-component transmits the preselected hybrid driving condition, as a recommended value, to the control sub-component, the strategy sub-component prescribes a change from the electric driving operating status to the hybrid driving operating status, but it is the control sub-component itself which determines the time when, and the manner in which, the said change from the electric driving status to the hybrid driving status is carried out.

In the motor vehicle control system according to the invention, as a possible recommended value which the operating status prescription module of the strategy sub-component can determine, a preselected hybrid driving condition is introduced, whose significance is that whereas in principle a change from the operating condition of electric driving to that of hybrid driving has been prescribed, it is the control sub-component itself which determines the time when, and the manner in which, the said change from the electric driving to the hybrid driving operating condition is carried out.

The strategy sub-component is independent of the specific configuration of the motor vehicle drivetrain and, therefore, prescribes a configuration-independent recommended value. The control sub-component, which does depend on the specific configuration of the drivetrain, generates a configuration-dependent target value from the configuration-independent recommended value.

In this way, the motor vehicle control system separates configuration-dependent functions from functions which are configuration-independent. Recommended values, prescribed by the operating status prescription module of the strategy sub-component of the hybrid functional component, are suitable for many possible drivetrain configurations and, accordingly, if a drivetrain configuration is changed, the values recommended by the operating status prescription module of the strategy sub-component can remain unaltered.

BRIEF DESCRIPTION OF THE DRAWINGS

Preferred further developments of the invention emerge from the subordinate claims and from the description given below. Example embodiments of the invention, to which it is not limited, are explained in greater detail with reference to the drawing, which shows:

The sole FIGURE is a schematic block circuit diagram of a motor vehicle control system for controlling a motor vehicle with a hybrid drive that comprises a motor vehicle and an electric motor.

DETAILED DESCRIPTION OF THE PREFERRED EMBODIMENTS

The sole FIGURE shows a schematic block circuit diagram of a motor vehicle control system 1, according to the invention, for controlling a motor vehicle with a hybrid drive that comprises a motor vehicle and an electric motor.

The motor vehicle control system 1 comprises a plurality of functional components 2, 3, 4, 5, 6 and 7 each divided into three sub-components such that each of the functional components 2 to 7 is divided into a strategy sub-component 8, a control sub-component 9 and an actuator sub-component 10. In the example embodiment shown in the sole FIGURE, these functional components, divided into at least three sub-components respectively are an internal combustion engine functional component 2 for controlling the internal combustion engine, a transmission functional component 3 for controlling a transmission, a hybrid functional component 4 for controlling the electric motor and a clutch connected between the internal combustion engine and the electric motor, a battery functional component 5 for controlling a battery, a brake functional component 6 for controlling a brake system and a retarder functional component 7 for controlling a retarder.

All the functional components 2 to 7 are divided into three sub-components 8, 9 and 10 but the actuator sub-component 10, of the hybrid functional component 4, is subdivided into two part-sub-components, namely, one part-sub-component 11 for the electric motor and one part-sub-component 12 for the clutch connected between the electric motor and the internal combustion engine.

Specific tasks or functions are assigned to the sub-components 8 to 10 of the functional components 2 to 7. Thus, the strategy sub-component 8 of each functional component 2 to 7 at least serves to determine at least one recommended value for the respective functional component 2 to 7, namely, for the control sub-component 9 of the respective functional component 2 to 7. In addition, the strategy sub-component 8, of each functional component 2 to 7, serves to determine data for influencing the strategy sub-component 8 of at least one other functional component and the control sub-component 9 of at least one other functional component.

The control sub-component 9 of each functional component 2 to 7 serves to check the, or each, recommended value provided by the strategy sub-components 8 of the respective functional components 2 to 7 and thereby to determine at least one target value for the respective functional components. In addition, the control sub-component 9, of each functional component 2 to 7, serves to determine data for influencing the strategy sub-component 8 and/or the control sub-component 9 of at least one other functional component. Furthermore, the control sub-component 9 preferably serves to feed back at least one actual parameter value to the strategy sub-component 8 of the respective functional component.

The actuator sub-component 10, of each functional component 2 to 7 at least serves to implement the, or each, target value and to feed back at least one actual parameter value to the control sub-component 9 of the respective functional component 2 to 7.

In addition to the functional components 2 to 7 divided into three sub-components, the motor vehicle control system 1 of the sole FIGURE comprises a plurality of functional components 13, 14, 15 and 16, which form an environment of the functional components 2 to 7. In the sole FIGURE, the functional components 13 to 16, that form the environment of the functional elements 2 to 7, consist of a driver's wish recognition functional component 13 which deduces a desired torque or a wish for sporty response on the basis of an accelerator pedal actuation and/or a brake pedal actuation, a driving situation recognition functional component 14 which deduces that the motor vehicle is driving around a curve and/or on an inclined road on the basis of transverse acceleration sensors and inclination sensors in the motor vehicle, an operating field function unit 15 which interrogates the selector lever and the operating elements of a transmission and/or retarder, and an assistance system functional component 16 which prescribes a torque and/or a speed.

The strategy sub-component 8 of the hybrid functional component 4 comprises at least a torque prescription module and an operating status prescription module 17. The torque prescription module serves to determine a recommended value for the torque distribution of a torque desired by the driver between the internal combustion engine and the electric motor of the hybrid drive. The operating status prescription module 17 serves to determine a recommended value for the operating status of the hybrid drive.

The strategy sub-component 8 of the hybrid functional component 4 and thus also its operating status prescription module are independent of any specific drivetrain configuration, so the strategy sub-component 8 of the hybrid functional component 4 transmits a configuration-independent recommended value for the operating status of the hybrid drive to the control sub-component 9. As the said recommended value, the operating status prescription module, in this case, determines one of the following four operating conditions: a) electric driving with the electric motor coupled to the drive output and the internal combustion engine static and decoupled from the drive output; b) electric driving with the electric motor coupled to the drive output and with the internal combustion engine running but decoupled from the drive output; c) hybrid driving with the electric motor coupled to the drive output and the internal combustion engine running and also coupled to the drive output; d) a preselected hybrid driving condition.

When the operating status prescription module of the strategy sub-component determines the preselected hybrid driving condition as the recommended value and transmits it to the control sub-component 9 of the hybrid functional component 4, then although in principle the strategy sub-component 8 is the one that has prescribed a change from the electric driving to the hybrid driving condition, it is the control sub-component 9 itself which determines the time when, and the manner in which, the said change from the electric driving to the hybrid driving condition is carried out.

In the case when the operating status prescription module of the strategy sub-component 8 of the hybrid functional component 4 transmits the preselected hybrid driving condition as the recommended value to the control sub-component 9 at a time when the hybrid drive is in the electric driving operating condition, the control sub-component 9 can implement the preselected hybrid driving condition and thus carry out a change from electric driving to hybrid driving, for example when, in the electric driving condition, a shift operation is to be carried out or there is a change from thrust to traction operation of the motor vehicle, for example.

If the strategy sub-component 8 of the hybrid functional component 4 transmits the preselected hybrid driving condition, as the recommended value, to the control sub-component 9 at a time when the motor vehicle is at rest with the electric motor coupled to the drive output and the internal combustion engine static and decoupled from the drive output, then the control sub-component 9 delays carrying out the change from the electric to the hybrid driving operating condition until the driver initiates moving-off of the motor vehicle. In this case, when the motor vehicle is at rest the internal combustion engine is not started directly by the driver, but rather as a reaction to the beginning of the vehicle's movement initiated by the driver.

Accordingly, the control sub-component 9 delays implementing the change from the electric to the hybrid driving operating status until some action is, in any case, going on in the drivetrain so that the change from electric to hybrid driving takes place without affecting the driver's comfort, i.e., as imperceptibly as possible.

Thus, from the above functional structure, it is clear that the operating status prescription module provides a recommended value which is independent of the specific drivetrain configuration of the motor vehicle.

From this configuration-independent recommended value, the control sub-component generates a configuration-dependent target value. Furthermore, if the recommended value is the said preselected hybrid driving condition, the control sub-component autonomously determines the time when, and the manner in which, a prescribed change from the electric driving operating condition to the hybrid driving operating condition is carried out.

INDEXES

1 Motor vehicle control system
2 Internal combustion engine functional component
3 Transmission functional component
4 Hybrid functional component
5 Battery functional component
6 Brake functional component
7 Retarder functional component
8 Strategy sub-component
9 Control sub-component
10 Actuator functional component
11 Part-sub-component
12 Part-sub-component
13 Driver's wish recognition functional component
14 Driving situation recognition functional component
15 Operating field functional unit
16 Assistance system functional component

The invention claimed is:

1. A motor vehicle control system for controlling a motor vehicle with a hybrid drive comprising:
an internal combustion engine and an electric motor,
a plurality of functional components, each of the functional components comprises at least three sub-components including a strategy sub-component (8), a control sub-component (9) and an actuator sub-component (10), the functional components at least including:
an internal combustion engine functional component (2) for controlling the internal combustion engine,
a transmission functional component (3) for controlling a transmission, and
a hybrid functional component (4) for controlling the electric motor and a clutch connected between the internal combustion engine and the electric motor, the strategy sub-component (8) of the hybrid functional component (4) comprises an operating status prescription module which determines a recommended value for the operating status of the hybrid drive and transmits the recommended value to the control sub-component (9) of the hybrid functional component (4), and a possible recommended value, that can be determined by the operating status prescription module, is a preselected hybrid driving condition, and, if the operating status prescription module of the strategy sub-component (8) of the hybrid functional component (4) transmits the preselected hybrid driving condition, as the recommended value, to the control sub-component (9) of the hybrid functional component (4), then the strategy sub-component (8) of the hybrid functional component (4) prescribes a change from an electric driving operating status to a hybrid driving operating status, and the control sub-component (9) of the hybrid functional component (4) determines a time when, and a manner in which, the change from the electric driving operating status to the hybrid driving operating status occurs.

2. The motor vehicle control system according to claim 1, wherein the strategy sub-component of each of the functional components is independent of specific drivetrain configurations of the motor vehicle such that the operating status prescription module of the strategy sub-component (8) of the hybrid functional component (4) transmits the recommended value, which is configuration-independent, to the control sub-component (9) of the hybrid functional component (4).

3. The motor vehicle control system according to claim 1, wherein the operating status prescription module of the hybrid functional component (4) determines, as the recommended value for the operating status of the hybrid drive, one of the following operating conditions:
a) electric driving with the electric motor being coupled to a drive output and the internal combustion engine being static and decoupled from the drive output;
b) electric driving with the electric motor being coupled to the drive output and the internal combustion engine running but decoupled from the drive output;
c) hybrid driving with the electric motor being coupled to the drive output and the internal combustion engine running and also coupled to the drive output; and
d) the preselected hybrid driving condition.

4. The motor vehicle control system according to claim 1, wherein the control sub-components (9) of the functional components depend on the specific drivetrain configuration of the motor vehicle to generate a target value, which is configuration-dependent, from the recommended value, which is configuration-independent.

5. A motor vehicle control system for controlling a motor vehicle with a hybrid drive comprising:
an internal combustion engine and an electric motor;
an internal combustion engine functional component (2), which controls the internal combustion engine, a transmission functional component (3), which controls a transmission, and a hybrid functional component (4) which controls the electric motor and a clutch that is connected between the internal combustion engine and the electric motor;
each of the internal combustion engine functional component (2), the transmission functional component (3) and the hybrid functional component (4) comprises at least a strategy sub-component (8), a control sub-component (9) and an actuator sub-component (10);
the strategy sub-component (8) of the hybrid functional component (4) comprises an operating status prescription module which determines one recommended value for an operating status of the hybrid drive and transmits the one recommended value to the control sub-component (9) of the hybrid functional component (4), and if the one recommended value for the operating status of the hybrid drive is a preselected hybrid driving condition, then the strategy sub-component (8) of the hybrid functional component (4) prescribes a change of the hybrid functional component (4) from an electric driving operating status to a hybrid driving operating status, and the control sub-component (9) of the hybrid functional component (4) determines a time at which, and a manner in which, the change from the electric driving operating status to the hybrid driving operating status occur;
the actuator sub-component (10) of the hybrid functional component (4) is sub-divided into an electric motor sub-component (11) and a clutch sub-component (12);
the control sub-component (9) of the hybrid functional component (4) communicates with and transmits at least one actual parameter value to the strategy sub-component (8) of the hybrid functional component (4); and
the actuator sub-component (10) of the hybrid functional component (4) communicates with and transmits at least one actual parameter value to the control sub-component (9) of the hybrid functional component (4).

* * * * *